United States Patent [19]

Ekstrom

[11] 4,121,460
[45] Oct. 24, 1978

[54] THERMOCOUPLE TEMPERATURE MEASURING INSTRUMENT AND METHOD OF MEASURING

[76] Inventor: Robert E. Ekstrom, 9133 S. Hoyne Ave., Chicago, Ill. 60620

[21] Appl. No.: 770,528

[22] Filed: Feb. 22, 1977

[51] Int. Cl.² .............................................. G01K 7/02
[52] U.S. Cl. ................................ 73/359 R; 73/343 R
[58] Field of Search ................... 73/1 F, 343 R, 359 R

[56] References Cited

U.S. PATENT DOCUMENTS

| | | | |
|---|---|---|---|
| 1,762,859 | 6/1930 | Gebhard | 73/343 R |
| 2,658,380 | 11/1953 | Evans | 73/1 F |
| 2,694,313 | 11/1954 | Nieman | 73/359 R X |
| 2,854,844 | 10/1958 | Howell | 73/1 F |
| 3,134,008 | 5/1964 | Finn | 219/513 X |
| 3,155,237 | 11/1964 | Mai | 73/359 X |
| 3,757,207 | 9/1973 | Hire | 73/1 F X |
| 3,797,310 | 3/1974 | Babcock et al. | 73/359 X |

Primary Examiner—Donald O. Woodiel
Attorney, Agent, or Firm—Merriam, Marshall & Bicknell

[57] ABSTRACT

This disclosure deals with a thermocouple instrument for measuring the temperature of a member, wherein the member forms part of one thermocouple junction. The member is made of an electrically conductive material, and the instrument includes two thermocouple electrical conductors. One end of each of the conductors is held in electrical engagement with the member, said one ends also being held in spaced apart relation. The member whose temperature is to be measured thus forms part of one junction of the thermocouple circuit, and an exact measurement of its temperature is obtainable. The other ends of the two conductors are connected to form a second junction, and a meter is connected to the conductors to indicate the temperature of the member.

6 Claims, 9 Drawing Figures

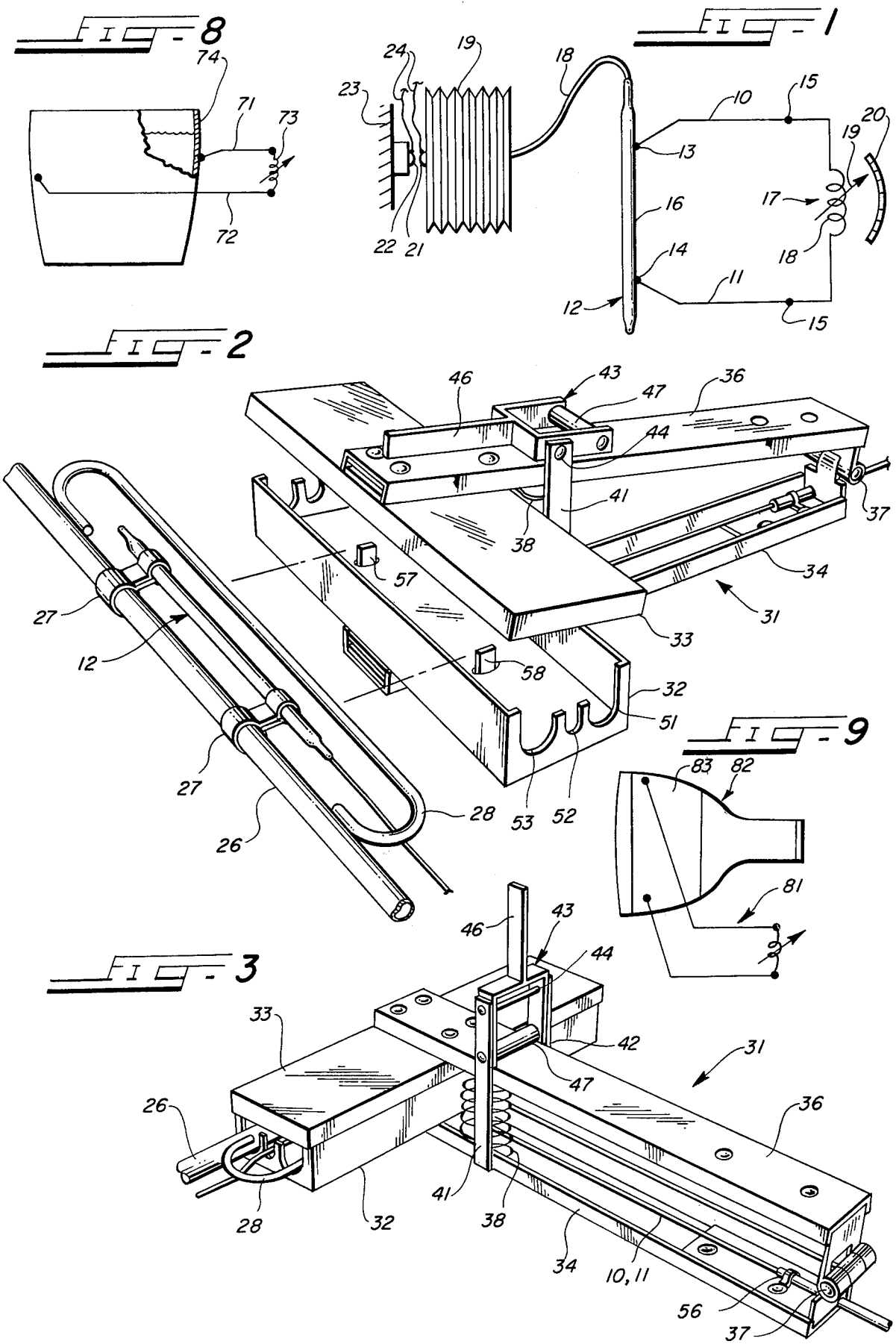

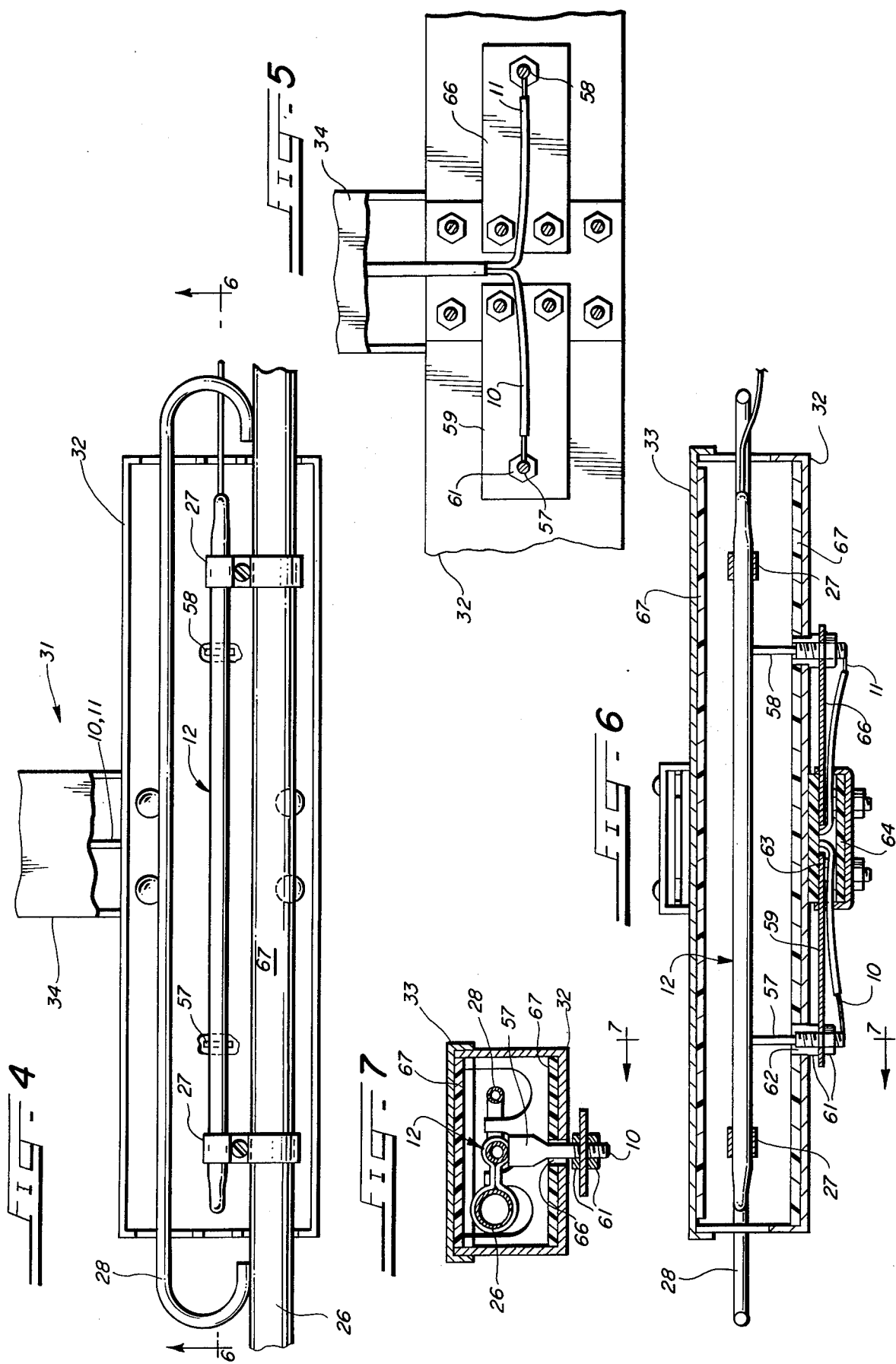

ure of a member made of an electrically conductive material, and comprises first and second thermocouple conductors and a meter. One end of each of the conductors is positioned in electrical engagement with the member but at spaced apart locations on the member, whereby the member forms part of a thermocouple junction. The meter is connected to the conductors and indicates the temperature of the member.

THERMOCOUPLE TEMPERATURE MEASURING INSTRUMENT AND METHOD OF MEASURING

BACKGROUND OF THE INVENTION

A commonly used temperature measuring instrument consists of a thermocouple and a meter. As is well known, a thermocouple includes two elongated electrical conductors of dissimilar materials, which are joined at their ends to form two junctions. Because of the dissimilarity of the materials, EMFs are generated at the junctions, and the EMFs are functions of temperature. If one junction is hotter than the other, the EMF at the hot junction will be greater than the EMF at the cold junction. The resultant EMF will cause current flow in the conductors, and the meter can be designed to measure the current flow or the resultant EMF. The current and the resultant EMF are, of course, functions of the difference in temperatures between the hot junction and the cold junction.

While thermocouples work well in principle and in many applications, difficulties are encountered in many temperature measuring requirements. For example, in an instance where it is necessary accurately to measure the temperature of a heated metal member, the hot junction is normally pressed against the the member to raise the temperature of the hot junction up to that of the member to be measured. However, it is often difficult to make the hot junction exactly equal in temperature to that of the member. As another example, it is frequently necessary to measure the temperature of a liquid held in a container. It would be possible to submerge the thermocouple hot junction in the liquid, but this frequently is not desirable.

It is a general object of the present invention to provide an improved thermocouple-type temperature measuring instrument, and a method of measuring temperature, which overcome the disadvantages of the prior art.

SUMMARY OF THE INVENTION

An instrument in accordance with the present invention is designed to measure the temperature of a member made of an electrically conductive material, and comprises first and second thermocouple conductors and a meter. One end of each of the conductors is positioned in electrical engagement with the member but at spaced apart locations on the member, whereby the member forms part of a thermocouple junction. The meter is connected to the conductors and indicates the temperature of the member.

The invention further comprises a method of measuring the temperature of an electrically conductive member, and includes the steps of positioning one end of a thermocouple conductor in electrically conductive engagement with a first location on said member, positioning one end of another thermocouple conductor in electrically conductive engagement with a second location on said member, said first and second locations being spaced apart and the portion of said member between said locations forming part of a thermocouple junction, electrically connecting the other ends of said conductors to form another thermocouple junction, and detecting the resultant EMF or the current in the thermocouple circuit caused by a difference in temperature of the two junctions.

BRIEF DESCRIPTION OF THE DRAWINGS

The foregoing and other objects and advantages of the invention will become more apparent from the following detailed description taken in conjunction with the accompanying figures of the drawings, wherein:

FIG. 1 is a schematic illustration of apparatus including instrument in accordance with the invention;

FIGS. 2 and 3 are perspective views of physical embodiments of the apparatus;

FIG. 4 is an enlarged view of a portion of the apparatus;

FIG. 5 is an enlarged view of another portion of the apparatus;

FIG. 6 is a sectional view taken on the line 6—6 of FIG. 4;

FIG. 7 is a sectional view taken on the line 7—7 of FIG. 6;

FIG. 8 is a schematic diagram of apparatus illustrating another use of the invention; and FIG. 9 is a schematic diagram of apparatus illustrating still another use of the invention.

DETAILED DESCRIPTION OF THE INVENTION

A measuring instrument in accordance with the invention comprises first and second thermocouple conductors 10 and 11 (FIG. 1). The materials for the conductors are selected to suit the anticipated temperature range. For example, if the instrument is designed to measure temperatures in the −250° F to 700° F range, the conductors 10 and 11 may be made of iron and constantan.

The instrument is designed to measure the temperature of a member 12 made of an electrical conducting material such as metal. The conductors 10 and 11 have ends 13 and 14 that engage the member 12 at locations or points which are spaced apart, and the portion 16 of the member 12 between the ends 13 and 14 forms an electrically conductive path. The portion 16 thus forms part of a thermocouple junction between the conductors 10 and 11.

The other ends 15 of the conductors 10 and 11 are connected to a meter 17, and this connection forms the second thermocouple junction. In the present illustration, the meter 17 comprises a milliammeter which responds to current flow in the thermocouple circuit. The meter 17 comprises a coil 18, a needle 19 and a suitable scale 20 which may be calibrated to provide a direct reading of temperature.

The amount of current flow in the circuit is a function of the resultant EMFs generated at the two thermocouple junctions, and the EMFs in turn are functions of the temperatures of the junctions. The resultant EMF is therefore a function of the difference between the temperature of the hot junction formed by the portion 16 and the ends 13 and 14, and the other ends 15 connected to the meter 17. The latter ends 15 are normally at ambient or room temperature. Since the portion 16 forms part of the hot junction, an exactly accurate measurement of the temperature of the member 12 is thereby obtained.

In the example illustrated in FIGS. 1 to 7, the member 12 is a bulb made of stainless steel, which forms part of a fail-safe unit in a control circuit for a heating rod. The bulb 12 is connected by a capillary tube 18 to a bellows 19, and the bulb 12, the tube 18 and the bellows 19 are filled with a heat-expandable fluid such as a gas. The control circuit includes two switch contacts 21 and 22, the contact 21 being attached to the bellows 19 and the contact 22 being fastened to a stationary frame 23. Leads 24 connect the contacts to the other parts of the control circuit. The contacts 21 and 22 are normally open, but when the bulb 12 is heated to a preselected upper temperature limit, the heated gas expands the bellows 19, and closes the contacts 21 and 22, and the control circuit then operates to deenergize the heating rod.

With reference to FIGS. 2 to 7, the numeral 26 indicates the heating rod which may be a heating element of the type sold commercially under the trademark CAL-ROD. The bulb 12 is fastened to the rod 26 by clamps 27, and a guard 28 is fastened to the rod 26 and encircles the bulb 12 to protect it.

The numeral 31 indicates a device for supporting the conductors 10 and 11 and holding them against the bulb 12. The device 31 includes a housing part 32 and a lid part 33 which are secured to ends of two arms 34 and 36. The other ends of the arms 34 and 36 are hinged together by a pin 37. A compression spring 38 (FIG. 3) is positioned between the arms and urges the parts 32 and 33 to an open position shown in FIG. 2. A clamp is manually movable to bring the parts 32 and 33 together in a closed position shown in FIG. 3. The clamp comprises two bars 41 and 42 formed by the arms of a U-shaped member fastened to the arm 34, and a member 43 which is pivotally mounted by a pin 44 between the bars 41 and 42. The member 43 includes a handle 46 at one end thereof and a roller 47 at the other end thereof. When the handle 46 is turned to make the member 43 extend laterally of the bars 41 and 42, the spring 38 moves the housing parts 32 and 33 to the open position (FIG. 2). When the handle 46 is turned to make the member 43 extend parallel to the bars 41 and 42, the roller 47 presses the arm 36 toward the arm 34 and moves the parts 32 and 33 to the closed position (FIG. 3). A catch is preferably provided to hold the member 43 in the latter position.

The part 32 has the shape of an open-ended box. Slots 51, 52 and 53 are formed in opposite ends of the part 32, which respectively receive the guard 28, the bulb 12 and the heating rod 26, as shown in FIGS. 3, 4, 6 and 7. The guard, bulb and rod are positioned in the slots when the parts 32 and 33 are in their open position (FIG. 2) and then the member 43 is turned to close the parts 32 and 33 which thus effectively enclose the bulb 12 and the rod 26.

The thermocouple conductors 10 and 11 are fastened to the arm 34 by clamps 56 and extend from the hinged ends of the arms 34 and 36 to the housing part 32. The conductors 10 and 11 extend under the housing part 32 as shown in FIGS. 5 and 6, and the ends 13 and 14 are formed by two terminals 57 and 58. The conductor 10 is fastened to and is made of the same metal as the terminal 57 which is supported on the outer end of a flexible metal leaf 59. The lower end of the terminal 57 is threaded, and two nuts 61 secure the terminal to the leaf 59. A hole 62 is formed in the bottom wall of the part 32 so that the terminal 57 cannot touch the part 32. The inner end 63 of the leaf 59 is positioned between two insulators 64 and is secured between the part 32 and the arm 34, so that the leaf 59 is electrically insulated from the part 32 and the arm 34. The spring-like leaf 59 urges the terminal 57 upwardly as seen in FIG. 6 and holds the inner end of the terminal 57 tightly in engagement with the bulb 12. The downward pressure of the bulb 12 on the terminal 57 flexes the leaf 59 downwardly and holds the nuts 61 out of engagement with the underside of the metal part 32. However, when the instrument is not in use, the leaf 59 moves the terminal 57 and the nuts 61 upwardly, and the nuts 61 engage the underside of the metal part 32. This is advantageous because the part 32 forms a shunt between the two terminals 57 and 58 when the instrument is not in use.

The other terminal 58 is similarly mounted on the outer end of another leaf 66. The terminal 58 is made of the same metal as the conductor 11, and the mounting arrangement is the same as that of the terminal 57.

The inside bottom surfaces of the two parts 32 and 33 are preferably lined with sheets 67 of an electrical and heat insulating material.

The terminals 57 and 58 extend through the holes formed in the bottom side of the part 32 and the sheet 67. The terminals extend into the interior of the housing formed by the closed parts 32 and 33, and they are located to engage the bulb 12 which is held in the slots 52 and pressed downwardly by the lid part 33. As shown in FIGS. 2 and 7, the inner ends of the terminals are flattened to ensure that they will firmly engage the bulb. The terminals 57 and 58 are spaced apart as shown in FIGS. 4 and 6 and as previously described.

As previously mentioned, the bulb 12 is part of a fail safe control circuit for the heating rod. In this example of the invention, the heating rod 26 is part of a cooker and is designed to be immersed in a container of cooking oil. A thermostat control (not shown) energizes the rod 26 so as to heat the oil to cooking temperature, such as 375° F. Such a control circuit also includes a fail safe circuit which is designed to deenergize the rod 26 if the oil temperature rises to an upper limit such as 500° F. Thus, if the normally used thermostatic control should fail and does not turn off the power circuit of the heating rod 26, the fail safe circuit will operate to turn off the power circuit when the upper limit of 500° F is reached. The bulb 12, bellows 19 and switch contacts, of course, form part of the fail safe circuit.

A problem encountered with such a fail safe circuit is that it has been difficult accurately to test the fail safe circuit to determine whether it will turn off the power circuit at the preselected upper limit of 500° F. During the manufacture of such a cooking unit, to test the fail safe circuit under normal operating conditions, it would be necessary to fill the container with cooking oil, disconnect the thermostatic control, raise the temperature of the oil until the fail safe circuit operates, and then measure the temperature of the oil. This procedure, of course, is very inconvenient and time consuming. To test the fail safe circuit in a cooking establishment after repairs by a service man would normally require a similar procedure, which is also potentially dangerous because of the excessively heated oil.

An instrument in accordance with this invention eliminates the foregoing disadvantages. To test the fail safe circuit, the rod 26 and the bulb 12 are positioned in the housing part 32 and the handle 46 is pivoted so as to close the housing parts 32 and 33. If the cooking container is filled with oil, the rod 26 and the bulb 12 are lifted out of the oil before testing. The sensor of the thermostatic control is also moved out of the oil. The pressure of the lid part 33 on the rod 26 presses the bulb 12 firmly against the terminals 57 and 58 and moves the nuts away from the part 32. The power circuit is then turned on and the rod 26 is heated. The thermostatic control does not operate to turn off the power to the rod 26 because the temperature sensor of the thermostatic control is suspended in the air and it is not heated by the rod and the oil as is normally the case. However, the bulb 12 is heated by the rod 26 because they are both encased in the insulated enclosure formed by the parts 32 and 33. The portion 16 of the bulb forms part of the hot thermocouple junction, and the meter 17 indicates the temperature of the bulb 12. The portion 16 of the bulb is also, of course, at the temperature of the gas filling the bulb and the bellows 19, and the temperature on the meter 17 is noted when the contacts 21 and 22 close and deenergize the rod 26.

Other types of meters may be used instead of a milliammeter. For example, a potentiometer may be used to measure the resultant EMF. Various well known compensators may also be included in the instrument.

The instrument may also be designed to measure the temperature of other metal members. For example, in FIG. 8, an instrument including two thermocouple conductors 71 and 72 and a meter 73 is used to measure the temperature of a liquid filled metal container 74. The hot junction is formed by ends of the conductors 71 and 72 and a portion 76 of the container 74, which is between the spaced ends of the conductors. As shown in FIG. 8, the ends of the conductors 71 and 72 are preferably positioned on opposite sides of the container 74. The wall of the container 74 is thin and is at approximately the temperature of the liquid filling it, and the meter 73 indicates a value that is a function of the liquid temperature. The conductors 71 and 72 are preferably fastened to a housing (not shown) which is adapted to be fastened to the outside of the container 74. Where the container 74 is made of a magnetic material, magnets (not shown) are preferably fastened to the housing for securing the housing to the container 74.

In FIG. 9, a similar instrument 81 is illustrated for measuring the temperature of a television tube 82. Part of the outer surface of the tube 82 is coated with a thin metal layer 83, and the portion of the layer 83 between the spaced ends of the thermocouple conductors, forms part of the hot thermocouple junction. Again, the ends of the conductors are preferably positioned against opposite sides of the tube 82.

Other uses for the invention will, of course, be apparent to those skilled in the art.

What is claimed is:

1. A portable instrument for measuring the temperature of an electrically conductive member, comprising a housing including first and second parts, means connecting said parts for relative movement of said parts between an open position where said parts are separated and a closed position where said parts are closely adjacent each other and form a substantially closed interior, two thermocouple conductors, one end of each of said conductors being mounted on said first housing part, said one ends being spaced apart and extending into the interior of said housing, said housing being adapted to receive said member within said interior and to be temporarily attached to said member, means on said second housing part for pressing said member against said ends of said conductors when said housing parts are in said closed position and for holding said one ends in electrically conductive engagement with spaced apart locations of said member, the portion of said member between said locations forming part of a thermocouple junction between said one ends and said junction generating an EMF which is a function of the temperature of said junction, the other ends of said conductors being electrically connected to means which responds to said EMF.

2. Apparatus as in claim 1, wherein said member comprises a bulb of a fail safe control circuit for a heating rod, and said housing parts are adapted to receive and enclose the bulb and the rod.

3. Apparatus as in claim 1, wherein said one housing part is made of metal, said one ends being electrically connected to said metal housing part when said member is not in said housing, means resiliently mounting said one ends on said one housing part and said one ends being adapted to be moved out of electrical connection with said one housing part when pressure is applied on said one ends by said member.

4. Apparatus as in claim 1, wherein said member is an electrically conductive container for a liquid.

5. Apparatus as in claim 1, wherein said member is an electrically conductive coating on an electronic tube.

6. Apparatus as in claim 1, and further including heating means in said housing for heating said member.

* * * * *